Patented July 6, 1954

2,683,165

UNITED STATES PATENT OFFICE 2,683,165

HYDROXYALKYL ALKYLENE DINITRAMINES AND THE CORRESPONDING NITRATE ESTERS

John R. Johnson and Alfred T. Blomquist, Ithaca, N. Y., and Fred T. Fiedorek, Akron, Ohio, assignors to the United States of America as represented by the Secretary of War No Drawing. Application June 25, 1947,
Serial No. 757,054

15 Claims. (Cl. 260—467)

1

The present invention relates to methods for producing hydroxyethylenenitramines and is particularly concerned with the preparation of bis-(2-nitroxyethyl) ethylenedinitramine.

Briefly, the method employed consists in the hydroxyalkylation of a nitramine by treating a nitramine with an alkylene oxide and converting to the corresponding nitrate ester. The resulting esters are particularly valuable as non-volatile nitrocellulose plasticizers in producing powders.

As a specific example of the present invention, the preparation of bis-(2-nitroxyethyl) ethylenedinitramine by reacting ethylenedinitramine with ethylene oxide and nitrating the product is as follows:

Mix 0.2 mole of ethylenedinitramine with water and 0.05 mole of sodium hydroxide. Stir the mixture gently and bubble in 9.8 hole of ethylene oxide. Continue stirring for about 12 hours and bubble in an additional 0.4 mole of ethylene oxide. Stir the mixture for about five days or until all of the suspended solid has gone into solution.

Remove the water and unreacted ethylene oxide at reduced pressure. The remaining oily residue solidifies and the resulting solid is then twice recrystallized from methyl alcohol whereby is obtained pure N-N'-bis(2-hydroxyethyl) ethylenedinitramine.

The N-N'-bis(2-hydroxyethyl) ethylenedinitramine is mixed, a portion at a time, with nitric acid while stirring and maintaining the temperature of the reaction at 10–15° C. during the addition. The mixture is poured into iced water forming a precipitate which is filtered and washed well with water. The produce separating from the filtrate is dried and recrystallized from methyl alcohol yielding crystalline bis-(2-nitroxyethyl) ethylenedinitramine having a melting point of 66.5–67.5° C.

The formula covering the foregoing is as follows:

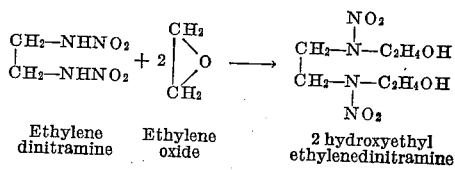

Ethylene dinitramine    Ethylene oxide    2 hydroxyethyl ethylenedinitramine

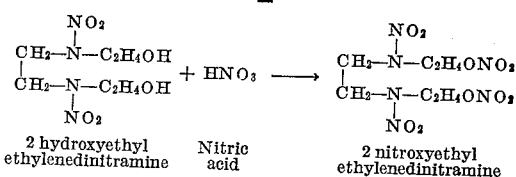

2 hydroxyethyl ethylenedinitramine    Nitric acid    2 nitroxyethyl ethylenedinitramine The foregoing reaction is generally applicable to the preparation of 2 hydroxyethyl nitramines which can be converted to 2-nitroxyethylnitramines. As for example bis-(2-nitroxyalkyl) alkylenedinitramine compounds can be prepared by treating the following:

1. Propylenedinitramine with ethylene oxide
2. Ethylenedinitramine with propylene oxide
3. N-methylethylenedinitramine with ethylene oxide The final products from Examples 1 and 2 have two nitroxyalkyl groups and two nitramine groups. These examples cover bis-hydroxyalkylation of two different bifunctional nitramines involving two different alkylene oxides.

In Example 3 only one hydroxyalkyl group is introduced as only one of the nitramine functions in the starting compound has a replaceable hydrogen. This is an example of monohydroxyalkylation of a nitramine.

It is to be understood that the foregoing detailed descriptions are given merely by way of illustration and that many variations may be made without departing from the spirit of our invention. Other uses within the scope of the invention will suggest themselves to those skilled in the art and are to be included within the scope of the claims appended hereto.

We claim:

1. The method of preparing hydroxyalkyl alkylenenitramines which comprises introducing a lower alkylene oxide into a slightly alkaline aqueous of a lower alkylenedinitramine.

2. The method of preparing hydroxyalkyl alkylene nitramines which comprises introducing an alkylene oxide selected from the class consisting of ethylene oxide and propylene oxide, into a slightly alkaline aqueous solution of an alkylene dinitramine selected from the class consisting of ethylenedinitramine and propylene dinitramine.

3. The method according to claim 2 wherein the alkylene oxide is ethylene oxide.

4. The method according to claim 2 wherein the alkylene oxide is propylene oxide.

5. The method according to claim 2 wherein the alkylenedinitramine is ethylenedinitramine.

6. The method according to claim 2 wherein the alkylenedinitramine is propylenedinitramine.

7. The method of preparing N-methyl-2-nitroxyethyl ethylene dinitramine which comprises introducing ethylene oxide into a slightly alkaline aqueous solution of N-methylethylenedinitramine.

8. The method of preparing hydroxyalkyl alkylenedinitramines which comprises slowly introducing an alkylene oxide, selected from the class consisting of ethylene oxide and propylene oxide into a slightly alkaline aqueous solution of an alkylenedinitramine selected from the class consisting of ethylene dinitramine and propylene dinitramine.

9. The method of preparing nitroxyalkyl alkylenenitramine which comprise introducing a lower alkylene oxide into a slightly alkaline aqueous solution of a lower alkylenedinitramine and nitrating the resulting product by adding nitric acid while maintaining the reaction at 10–15° C. and then precipitating in ice water.

10. The method of preparing N-N'-bis(2-hydroxyethyl) ethylenedinitramine which comprises slowly bubbling ethylene oxide into a slightly alkaline aqueous solution of ethylenedinitramine.

11. The method of preparing bis(2-nitroxyethyl) ethylenediamine which comprises forming as an intermediate N-N'-bis(2-hydroxyethyl) ethylenedinitramine by the method of claim 10, and nitrating the intermediate product by adding nitric acid while maintaining the temperature of the reaction at 10–15° C. during the reaction, and then precipitating in ice water.

12. The method of preparing bis(2-nitroxyethyl) ethylenedinitramine which includes the step of nitrating N-N'-bis(2-hydroxyethyl) ethylenedinitramine by adding nitric acid while maintaining the temperature of the reaction at 10–15° C. during the reaction and then precipitating in ice water.

13. Method of preparing bis(2-nitroxyethyl) ethylenedinitramine consisting in mixing ethylenedinitramine, water and sodium hydroxide, introducing ethylene oxide to said mixture while stirring, removing water and unreacted ethylene oxide from said mixture, recrystallizing the residue from said mixture, adding nitric acid to said residue while stirring, maintaining the temperature of the reaction at 10–15° C. during the reaction and separating the precipitate therefrom.

14. N-N'-bis(2 - hydroxyethyl) ethylenedinitramine.

15. Bis(2 - nitroxyethyl) ethylenedinitramine.

References Cited in the file of this patent

UNITED STATES PATENTS

| Number | Name | Date |
|---|---|---|
| 1,691,955 | Bergeim | Nov. 20, 1928 |
| 2,174,762 | Schuette et al. | Oct. 3, 1939 |
| 2,337,004 | Schwoegler | Dec. 14, 1943 |
| 2,373,199 | Schwoegler | Apr. 10, 1945 |
| 2,415,001 | Bradner | Jan. 28, 1947 |

FOREIGN PATENTS

| Number | Country | Date |
|---|---|---|
| 500,407 | Germany | July 1, 1930 |
| 514,955 | Germany | Feb. 16, 1931 |

OTHER REFERENCES

Knorr et al.: "Ber. deut. Chem.," vol. 31 (1898), pp. 1069, 1072 and 1073.

Kitchen et al.: "J. Org. Chem.," July 1943, vol. 8, pp. 342–343.